United States Patent [19]

Kawata et al.

[11] Patent Number: 4,981,741
[45] Date of Patent: Jan. 1, 1991

[54] COATING ALLOY

[75] Inventors: Kaoru Kawata; Shoji Futami; Yasuhiro Okamura, all of Kamakura, Japan

[73] Assignee: Mitsubishi Denki Kabushiki Kaisha, Tokyo, Japan

[21] Appl. No.: 217,035

[22] Filed: Jul. 11, 1988

Related U.S. Application Data

[63] Continuation of Ser. No. 28,115, Mar. 19, 1987, abandoned.

[30] Foreign Application Priority Data

Mar. 19, 1986 [JP] Japan ................................. 61-61471
May 28, 1986 [JP] Japan ............................... 61-122807
Aug. 19, 1986 [JP] Japan ............................... 61-193147

[51] Int. Cl.$^5$ ............................................ G11B 23/00
[52] U.S. Cl. ...................................... 428/64; 428/674; 428/680; 428/457; 428/694; 428/900
[58] Field of Search ............... 428/457, 674, 680, 694, 428/900, 928; 204/14.1

[56] References Cited

U.S. PATENT DOCUMENTS 3,764,352 10/1973 Gulla ........................................ 106/1
3,832,168 8/1974 Gulla ...................................... 428/928
4,397,812 8/1983 Mallory, Jr. ......................... 420/441
4,724,188 2/1988 Saito et al. ........................... 428/900

FOREIGN PATENT DOCUMENTS 164135 12/1985 European Pat. Off. .
60-261022 12/1985 Japan .
61-03317 1/1986 Japan .
188734 8/1986 Japan .
202326 9/1986 Japan .

OTHER PUBLICATIONS

"Effect of Heat-Treatments on Magnetic Properties of Electroless Nickel Alloy", May, 1976, pp. 606–614.

Primary Examiner—Paul J. Thibodeau
Attorney, Agent, or Firm—Oblon, Spivak, McClelland, Maier & Neustadt

[57] ABSTRACT

A coating alloy to be coated on a substrate which consists essentially of from 40 to 60% by weight of Ni, the rest being Cu and P.

2 Claims, 7 Drawing Sheets

Treatment at 300°C for 3 hours
○ No crack after heat treatment
× Crack after heat treatment

COATING ALLOY

This application is a continuation of application Ser. No. 07/028,115, filed on Mar. 19, 1987, now abandoned.

BACKGROUND OF THE INVENTION

1. Field of the Invention

The present invention relates to a coating alloy. More particularly, it relates to a coating alloy having improved non-magnetic and heat resistance characteristic.

2. Discussion of Background

The conventional coating alloys have been used for a surface layer or an undercoat layer as a carrier for, for instance, magnetic recording medium for the primary purpose of improving hardness or a finished surface of the layer, rather than the magnetic characteristics of the layer.

There has been a demand for a coating alloy which is not magnetized even when it has been subjected to a treatment at a high temperature. In response to the demand, an Ni-P series coating alloy has been proposed. However, the Ni-P series alloy, which is coated on a metal substrate, has a problem of its having a magnetic transition point at about 300° C. or lower; and accordingly, it is magnetized at a relatively low temperature of about 250° C. When such alloy is applied to a part which is used in a weak magnetic field (such as 1 KOe or lower) there arises a serious problem. For instance, when it is used in a device which is operated by a magnetic signal resulted from magnetic substance arranged in the longitudinal direction of a track, a closed magnetic circuit is formed between the magnetic recording medium and an undercoat layer which has been magnetized. As a result, an effective magnetic flux in the surface layer of the medium is decreased to thereby cause reduction in S-N ratio. Since a treatment at a high temperature is needed to prepare a magnetic disc coated with the coating alloy, the alloy is magnetized. Therefore, there causes great problems of reduction of the effective quantity of the magnetic flux and generation of magnetic noises in an apparatus which is operable by magnetic signals or is apt to suffer adverse effect by the magnetic noises.

Further, it is necessary for the undercoat layer formed on the substrate to have a sufficient hardness, and any crack should not be formed even though it has been subjected to a heat treatment at about 300° C. The crack formed on the magnetic recording disc is classified into two kinds: unicircle cracks and radial cracks as shown in FIGs. 10(a) and 10(b). Further, it was revealed that the crack has a structure in cross section as shown in FIG. 11.

SUMMARY OF THE INVENTION

It is an object of the present invention to provide a coating alloy having improved non-magnetic and heat resistance characteristics such that it is not magnetized at a high temperature treatment of about 450° C.

It is another object of the present invention to provide a coating alloy having a sufficient hardness and providing an improved surface.

The foregoing and the other objects of the present invention have been attained by providing a coating alloy to be coated on a substrate which consists essentially of from 40 to 60% by weight of Ni, the rest being Cu and P.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

An Ni-Cu-P series alloy according to the present invention is preferably used for the undercoat layer of a magnetic recording medium. In the three-component alloy of the present invention, Ni contributes the maintenance of a stable non-magnetic condition even the alloy is subjected to a heat treatment at a high temperature of about 400° C. In this case, the alloy preferably contains 40-60% by weight of Ni, more preferably, 50-60% by weight.

The content of Cu is preferably in the range of 34±5 wt % to satisfy both the prevention of cracks as well as the maintenance of the non-magnetic characteristics.

Figure 9:
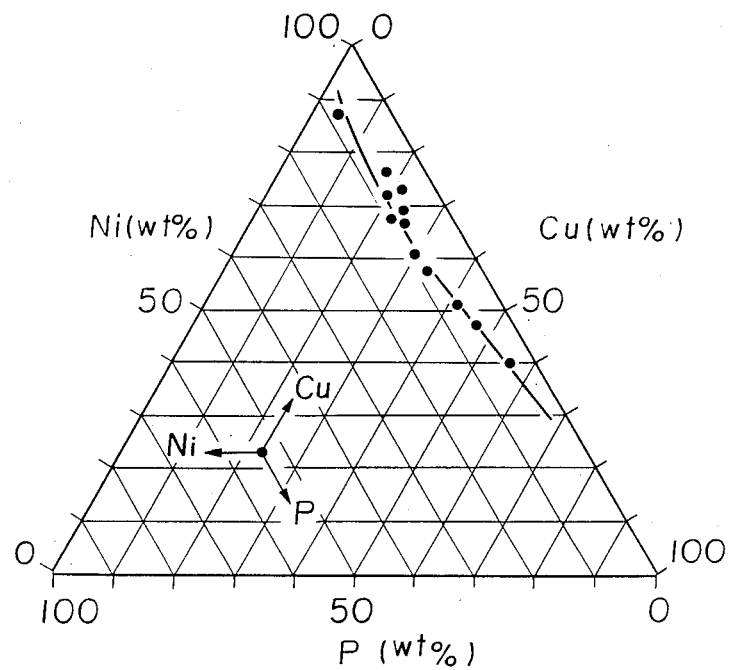
FIG. 9 is a diagram showing a phase of precipitation of an Ni-Cu-P alloy.
Figures 10A, 10B:
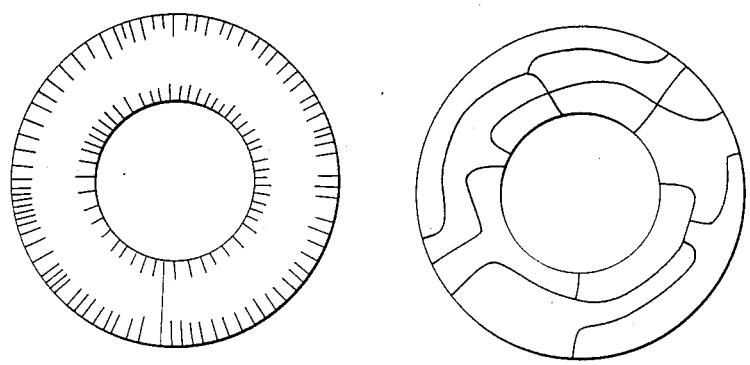
FIGS. 10a and 10b are diagrams showing occurrence of cracks in Ni-Cu-P alloy.
Figure 11:
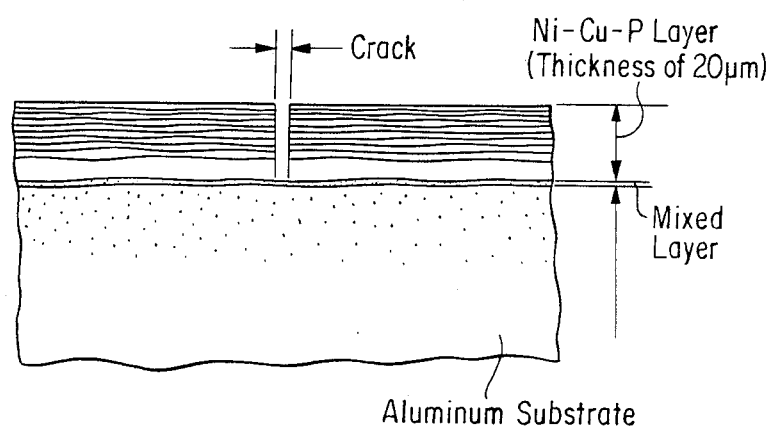
FIG. 11 is a cross-sectional view of a magnetic recording medium in which a crack takes place.
Figure 12:
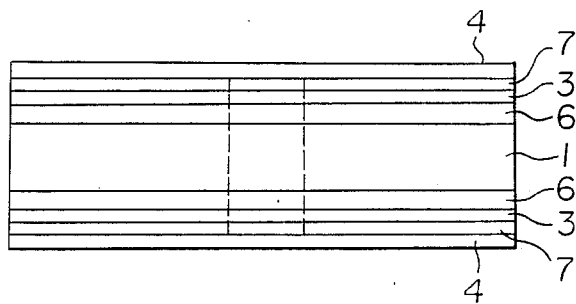
FIG. 12 is a cross-sectional view of a conventional magnetic recording disc with a protective layer.

When the coating alloy of the present invention is to be formed on the base substrate by chemial plating, the content of P is determined as shown in a diagram showing precipitation phase in FIG. 9, namely, in the range of $11 \geq P \geq 7$ (wt %).

Figure 1:
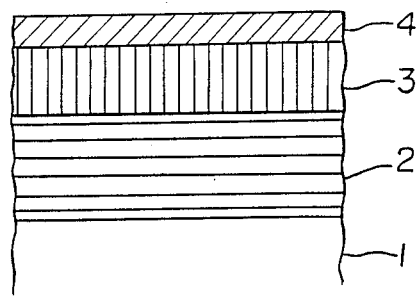
FIG. 1 is an enlarged cross-sectional view partly broken of a magnetic recording medium in which the coating alloy of the present invention is used.

An embodiment of the present invention will be described with reference to FIGS. 1 to 5. FIG. 1 is a cross-sectional view partly broken of a magnetic recording medium comprising a non-magnetic substrate 1 on which a hardened non-magnetic layer 2 is formed to protect the surface of the substrate 1. Further, a magnetic medium layer 3 and a smoothed surface layer 4 are laminated in this order. The hardened non-magnetic layer 2 covering the surface of the non-magnetic substrate 1 is constituted by the coating layer as above-mentioned. The hardened non-magnetic layer 2 may be formed by a chemical plating.

Figure 2:
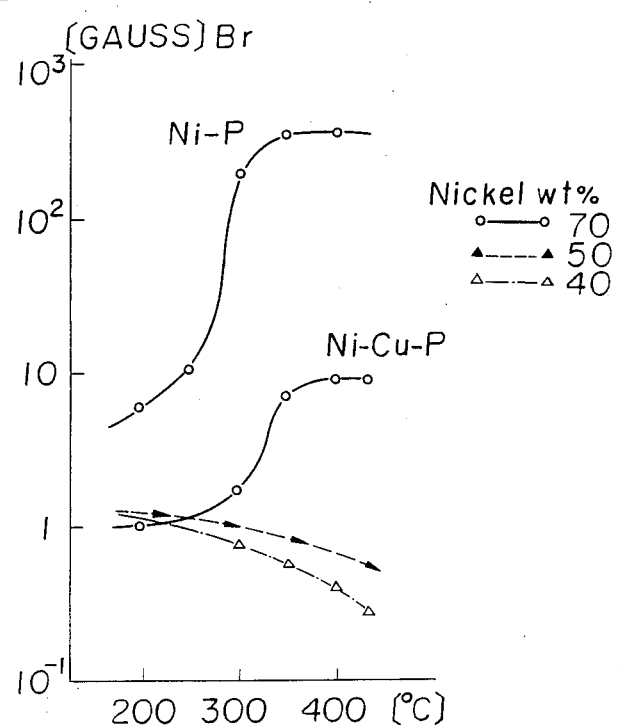
FIG. 2 is a graph showing a relation of magnetization to annealing temperatures of a conventional alloy and Ni-Cu-P series alloys for the purpose of comparison.

FIG. 2 is a graph showing magnetic characteristics of the hardened non-magnetic layers 2 having different formulations in the alloy and treated at a high temperature. As apparent from FIG. 2, the conventional Ni-P alloy is rapidly magnetized at 200° or higher. In the case of use of an Ni-Cu-P alloys, when more than 70% by weight of Ni is included, magnetization of the alloy is more or less decreased; however the quantity of the magnetic flux is somewhat decreased which possibly causes the occurrence of magnetic noises. Therefore, it is insufficient to use it for the magnetic recording medium disc. On the other hand, in the case of the alloys having 50 wt % or 40 wt % of Ni, the magnetization of the alloys is decreased even though they are subjected to te heat treatment at temperatures in the range of from 200° C. to 400° C. and the non-magnetic condition is certainly maintained.

Figure 3:
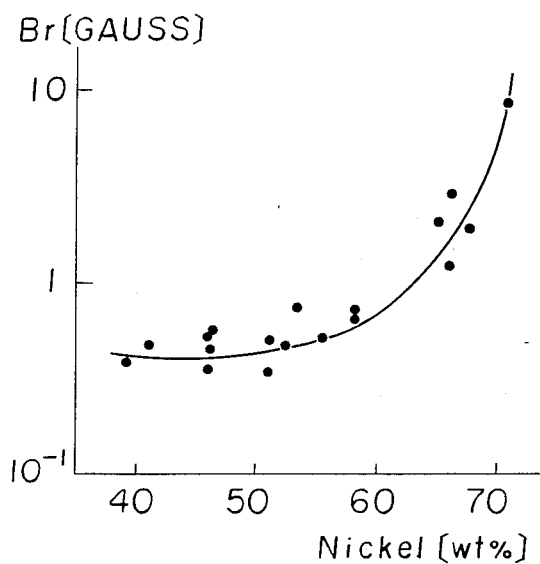
FIG. 3 is a graph showing a relation of the non-magnetic characteristics of the Ni-Cu-P series alloy to the quantity of Ni.

FIG. 3 is a graph showing a relation of the density of the residual magnetic flux of the Ni-Cu-P coating alloys to the Ni contents when the Ni contents vary from 40 wt % to 70 wt %, each coating alloy being treated at a temperature of 400° C. The graph shows that the non-magnetic condition of the coating alloy is stably maintained when the content of Ni is in the range from 40 wt % to 60 wt %, while magnetization suddenly takes place when the Ni content is about 70 wt %.

Figure 4:
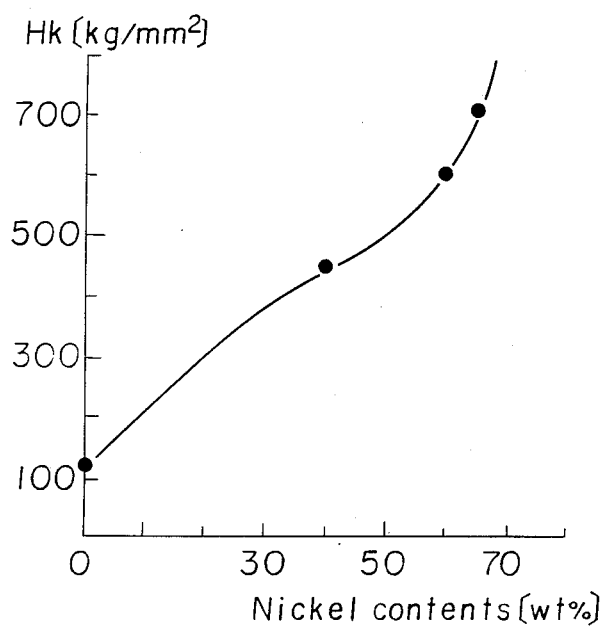
FIG. 4 is a graph showing a relation of the knoop hardness of the coating alloy of the present invention to nickel contents.

FIG. 4 is a graph showing a result of measurement of the hardness of the hardened non-magnetic layer 2. As shown in FIG. 4, the coating alloy having 40 wt % or higher of Ni assures a practical hardness of Hk 400 or higher.

A magnetic medium layer 3 is formed on the coating alloy layer 2 by sputtering. Although the sputtering process requires a high temperature of about 400° C., the hardened non-magnetic layer 2 maintains the non-magnetic condition.

Figure 6:
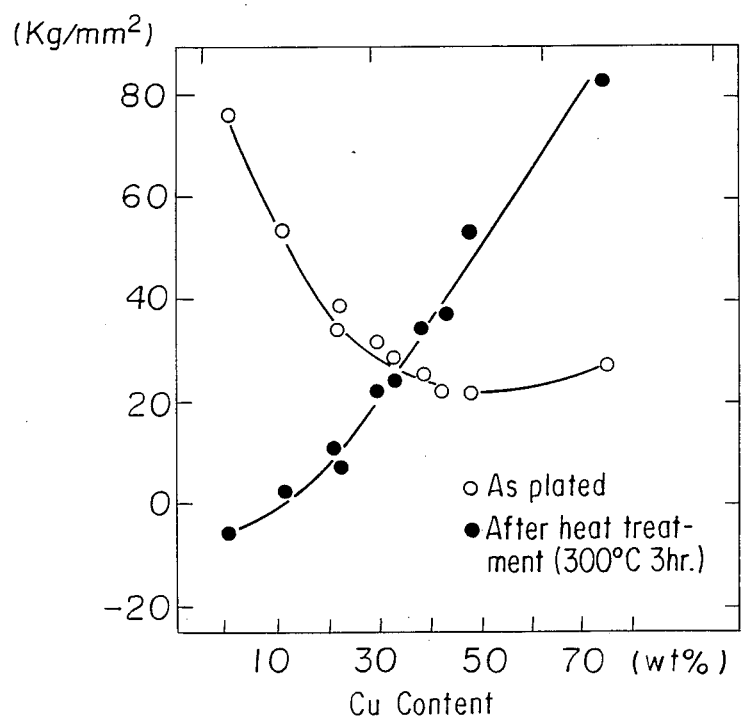
FIG. 6 is a diagram showing a relation between copper contents and the stress.

FIG. 6 is a graph showing a relation between a stress and the Cu contents of the coating alloy. The data are obtained by changing the Cu contents in the Ni-Cu-P alloy with or without the heat treatment. In the tests of the sampled alloy, the quantity of bending of a rectangular aluminum plate having one surface coated with a plated layer, is measured.

In addition, thermal expansion coefficient is measured on each aluminum foil both surfaces of which are plated with the Ni-Cu-P alloy, which is subjected to a heat treatment at a temperature from the room temperature to 300° C. The result of the measurements is shown in a graph in FIG. 7 which shows a relation between the thermal expansion coefficient and the copper contents.

Figure 7:
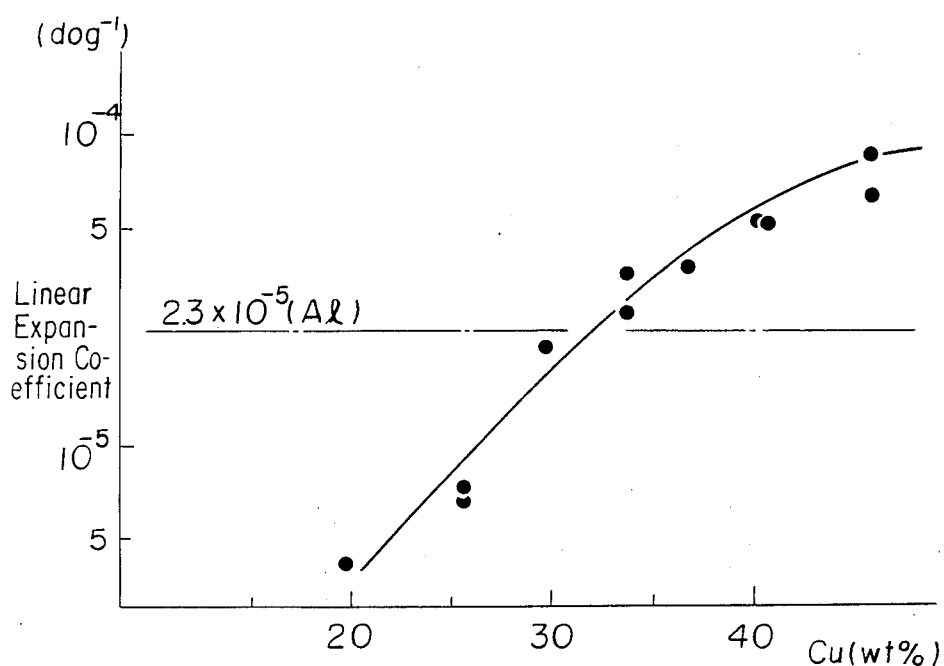
FIG. 7 is a diagram showing a relation between copper contents and thermal expansion.

FIGS. 6 and 7 show that there is no change in stress in the coating alloy containing Cu in the range of 34±5 wt %, and the thermal expansion coefficient of the alloy is substantially equal to that of aluminum.

Figure 8:
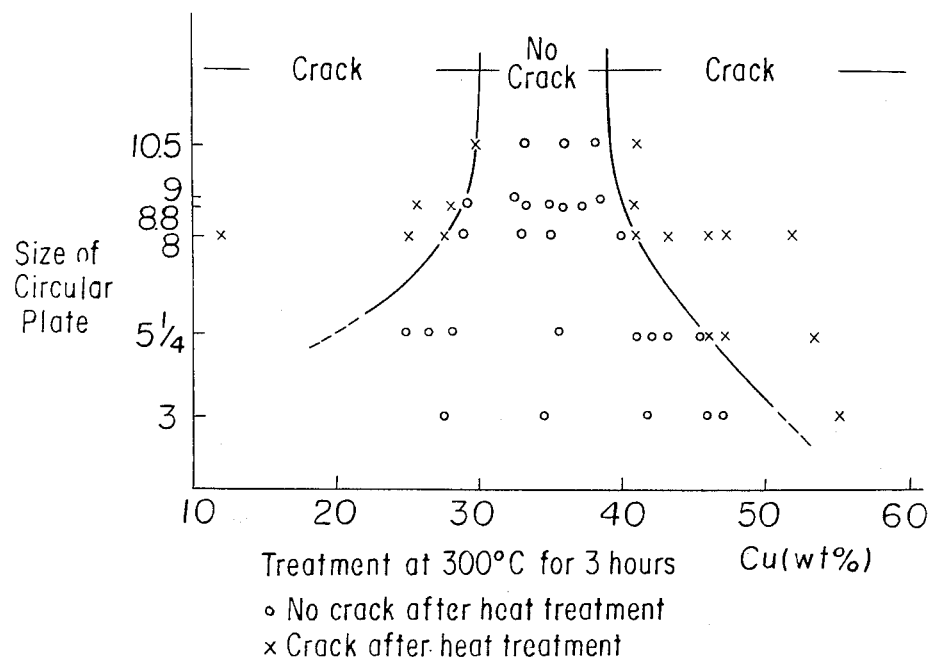
FIG. 8 is a diagram showing a relation between the size of circular plate of the non-magnetic substrate and occurrence of cracks.

The coating alloy having the Cu contents of 34±5 wt % is coated on circular plates having the sizes of 3 (inches), 5¼", 8", 8.8", 9" and 10.5" respectively, and occurrence of the cracks is examined. FIG. 8 is a graph showing the result of the examination. The graph shows limits of the size of the circular plates in which no crack takes place. The result is understandable from a relation of the thermal expansion coefficient and the thermal stress. In conclusion, the three-component alloy condisting of Ni, Cu and P in which the Cu content is in the range of 34±5 wt % is desirable for the hardened non-magnetic surface used for a magnetic disc.

Figure 5:
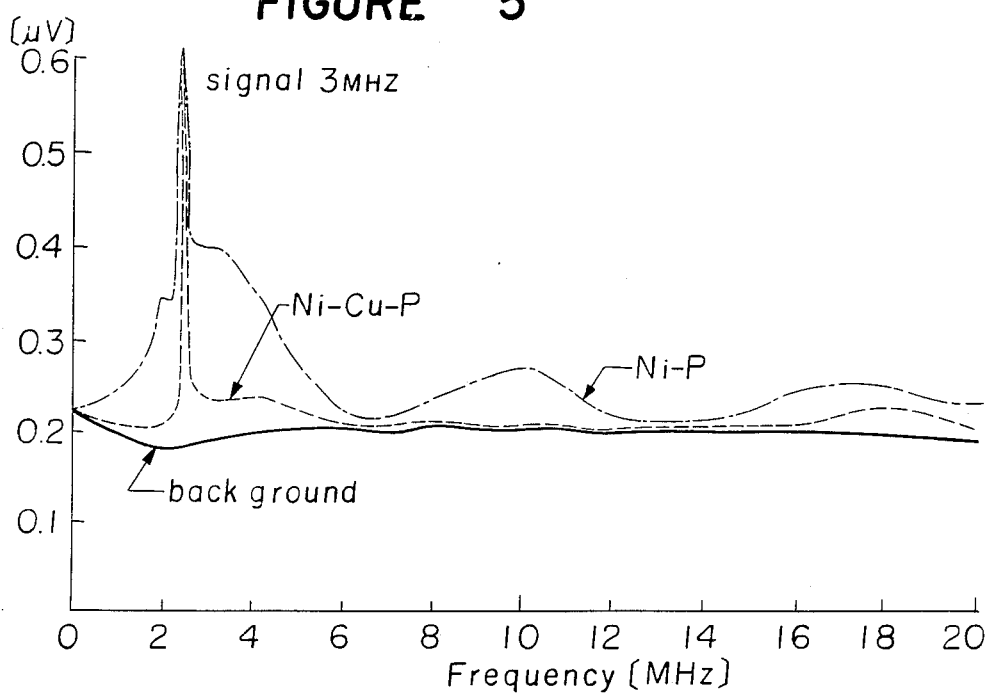
FIG. 5 is a spectral diagram showing noises of the conventional Ni-P alloy and the coating alloy of the present inveniton.

FIG. 5 is a spectral diagram showing frequency characteristics of the recording medium coated on the coating alloy of the present invention. It shows a frequency spectrum of the output when a signal of 3 MHz is recorded in the recording medium is read out. It is clearly shown in FIG. 5 that a sharp output is obtainable when the Ni-Cu-P alloy of the present invention is used, whereas the shape of the frequency spectrum the signal of 3 MHz in the conventional Ni-P alloy is not sharped; this suggests occurrence of large noises. Namely, the S-N ratio of the Ni-Cu-P alloy of the present invention is remarkably improved in comparison with the conventional Ni-P alloy.

In the above-mentioned embodiment, description has been made as to application of the coating alloy to the hardend non-magnetic layer for the magnetic recording medium. However, the present invention is applicable to a surface layer for a supporting body or an exciting coil in electric devices other than the magnetic disc. In this case, a uniform magnetic field can be formed even when it is heated at a high temperature up to 400° C., because of the non-magnetization characteristics in a broad temperature range of the coating alloy of the present invention. Accordingly, efficient electromagnetic transdusing charcteristics can be obtained.

The coating alloy of the present invention can be coated on another non-magnetic substrate other than aluminum alloys.

The three-component alloy of the present invention is compatible with the magnetic recording medium layer 3 consisting of $\gamma$-$Fe_2O_3$, Co-Ni, Co-Cu, Co-Ni-P, Ba-Ferrite, Tb-Fe, Gd-Co and so on. Further, it is compatible with a smoothed surface layer 4 condisting of $SiO_2$, Tin, Sic, C and so on. In any case, the same effect of non-magnetization, hardness and heat resistance can be obtained.

The effect of the Ni-P-Cu three-component alloy used for the hardened non-magnetic layer 2 for a magnetic disc will be described in more detail.

Figure 13:
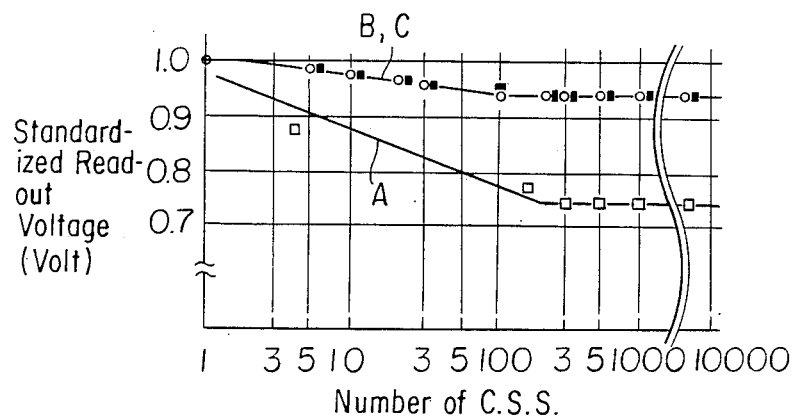
FIG. 13 is a graph showing a relation of standardized read-out voltage to the number of contact start-stop operations.

An alumite layer has generally been used as an undercoat layer for a thin layer of $\gamma$-ferrite which is a magnetic recording medium for a magnetic disc. FIG. 13 is a cross-sectional view of a double surface type magnetic disc. A non-magnetic layer consisting of an alumite layer having a thickness of 5 $\mu$m–20 $\mu$m is formed on a base substrate 1 made of an aluminum alloy by dipping it in a chrominum bath or an organic acid bath. After forming a mirror surface on the alumite layer 6 by mechanically polishing (e.g. lapping) a thin magnetic layer 3 (0.1 $\mu$m–0.3 $\mu$m) of magnetite ($Fe_3O_4$) is formed by sputtering, thereafter it is heated at about 300° C. for several hours in the atmosphere to form a magnetic layer 3 of $\gamma$-ferrite ($\gamma$-$Fe_2O_3$). The magnetic layer 3 is a recording medium suitable for magnetically recording. The recording medium possesses a magnetic hysteresis curve having a high rectangular ratio. Then, a protective layer 7 consisting of a material such as $SiO_2$ is formed on the surface of the magnetic layer 3 of $\gamma$-ferrite at a thickness of 0.03 $\mu$m–0.08 $\mu$m. A smooth layer 4 made of a material such as a fluorine type resin is formed on the protective layer 7. The alumite layer, i.e. the non-magnetic layer 6 hardens the surface of the base substrate 1 for finishing it into a mirror surface and imparts anti-corrosion properties and strength as the undercoat layer for the magnetic layer 3.

Although the alumite layer 6, i.e. the non-magnetic layer 6 possesses excellent characteristics, there is a problem of durability when contact start-stop (CSS) tests are conducted, and therefore, it is necessary to form the protective layer 7. When a magnetic disk having the construction as above-mentioned is used with a Winchester type magnetic head device, a phenomenon described below usually occurs. Namely, when a relative speed between the disc and the head at the starting time or the stopping time is in a predetermined value or lower, a relative sliding movement takes place between the disc and the head under contacting condition. The magnetic disc is normally required to have durability to more than 10,000 cycled operations of the contact start-stop. If the magnetic disc is not provided with the protective layer 7, about 25% reduction of a head read-out voltage takes place due to pressure demagnetization of 20 the magnetic recording medium when 200-300 times (cycle) of the contact start-stop is carried out, as shown by a sample A curve in FIG. 13, the pressure demagnetization being caused by the head during the sliding contact.

Generally, reduction of the output voltage up to 10 percent due to the pressure demagnetization has been considered to be permissible. However, when it exceeds 10 percent, it raises a serious problem. It has been considered that the reduction of the output exceeding 10 percent due to the pressure demagnetization in the normal CSS cycle is caused by brittleness of the alumite layer, i.e. the non-magnetic layer 6 under the magnetic layer 3 because the non-magnetic layer 6 is porous ($10-30 \times 10^9$ number/cm$^2$).

When the undercoat layer for the magnetic layer 3 is brittle, the magnetic layer 3 is slightly deformed by the pressure of the head in the CSS operation, whereby reduction in reverse magnetostriction may occur.

Thus, it has been necessary to avoid the direct contact of the magnetic layer 3 to the head to thereby minimize an abnormal pressure demagnetization. For this purpose, the protective layer 7 of about 0.03 μm-0.08 μm has been formed on the magnetic layer 3. By forming the protective layer 7, the reduction of the head read-out voltage caused by the pressure demagnetization can be within 10 percent as shown by a sample B curve in FIG. 13.

The γ-ferrite layer originally has a high hardness (1,000 on micro-Vickers scale) and has excellent anti-corrosion properties, and therefore, it is unnecessary to form the protective layer as required when other medium is formed by plating, or cobalt alloy layer is formed by sputtering. When the protective layer is formed for the conventional magnetic disc, an air gap loss is caused for the thickness of the protective layer. Especially, when a height to float the head is determined to be 0.2 μm or lower, a great problem is caused by the protective layer.

In the above-mentioned embodiment, there can be realized the effect, as described in detail below, that the pressure demagnetization in the magnetic medium is minimized and reduction of the output voltage in the head due to the pressure demagnetization can be within 10 percent even though the protective layer is not formed, by utilizing the excellent characteristics of the γ ferrite medium and by obtaining a desired resolution for an air gap. Namely, the hardened non-magnetic layer 2 consisting of the three-component alloy layer 2 of Ni-Cu-P formed by the chemical plating has a high hardness (600-800 kg/mm$^2$ on Vickers scale) and is, of course, less porous. Also, it thermally stable, that is, it is not transformed into a ferromagnetic substance even by heating it at about 300° C. for several hours. Accordingly, when the non-magnetic layer is used for the undercoat layer of the magnetic medium, there is no reverse magnetostriction under the normal CSS, and the reduction in output voltage due to the pressure demagnetization can be within 10 percent as shown by a sample curve C in FIG. 13. This allows that a height to float the head can be 0.2 μm or lower.

Figure 14:
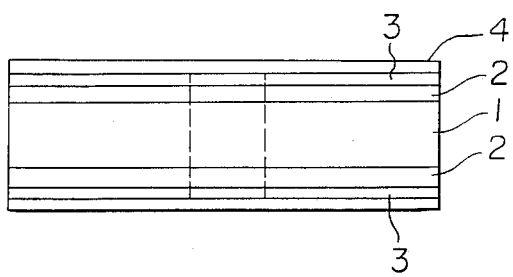
FIG. 14 is a cross-sectional view of an embodiment of the magnetic recording disc of the present invention having the characteristic as shown in FIG. 13.

The construction of the magnetic disc from which the experimental data in FIG. 13 were obtained will be described with reference to FIG. 14.

An aluminum alloy is used for the base substrate 1. A gilding layer of the Ni-Cu-P three-component alloy is formed on the base substrate 1 as the hardened non-magnetic layer 2 at a thickness of 10 μm-20 μm. A gilding bath for the chemical plating typically includes 3 gr/l of Nickel ion from sulfate, 1 gr/l of Copper ion from sulfate, 0.5 gr/l of hypophosphorous acid soda and a suitable amount of an oxydizing agent, the bath being adjusted to be pH9-10 and being heated at a temperature of 70° C.-80° C. The non-magnetic layer 2 of the Ni-Cu-P three-component alloy is then subjected to a lapping treatment to remove a surface layer of 2 μm-5 μm and finish it to have a surface roughness of about Rmax 0.05 μm. Then, γ-ferrite medium, i.e. the magnetic layer 3 is coated on the non-magnetic layer 2. The coating is carried out by sputtering in a glow discharge, wherein iron particles are scattered on the gilding layer 2, i.e. the hardened non-magnetic layer and at the same time, a suitable amount of oxygen gas is supplied, whereby a magnetite ($Fe_3O_4$) layer having a thickness of 0.1 μm-0.3 μm is uniformly deposited on the polished surface of the hardened non-magnetic layer 2. Then, the magnetic disc is heated in air at a high temperature such as 300° C. for 2 hours to thereby form the γ-ferrite ($\gamma$-$Fe_2O_3$) layer as a recording medium having excellent magnetic characteristics.

FIG. 13 shows a result of experiments on the magnetic recording medium thus obtained, and a relation of the read-out voltage of the magnetic disc to the CSS cycle is shown by the sample C curve. FIG. 13 shows that although reduction in output takes place in proportion to the number of cycle till 100 cycles, there is no further reduction in output and reduction rate is within 10 percent. The sample C curve is substantially the same as the sample A curve (indicative of a magnetic layer with the protective layer on the alumite layer). This means that by using the Ni-Cu-P three-component alloy layer 2 as the undercoat layer of the recording medium, but not using the protective layer, there is obtainabe the same performance as the magnetic medium having the protective layer in which the alumite layer is used as the undercoat layer. It is because the Ni-Cu-P three-component alloy layer as the non-magnetic layer 2 provides a harder, non-porous, strong undercoat layer unlike the alumite layer. The uniform and strong undercoat layer prevents a phenomenon of reverse magnetostriction of the medium even though there is a pressure of the head in the CSS operations, hence, there is no further demagnetization.

In the above-mentioned experiments, descripiton has been made as to use of the γ-ferrite medium, i.e. the magnetic layer for magnetic recording in the longitudinal direction. However, the present invention is applicable to the vertical recording system. Namely, when Barium or Rhenium is added to the γ-ferrite medium, i.e. the magnetic layer 3, the medium becomes suitable to be used for the vertical recording system. The air gap loss in the vertical recording system is greater than that in the longitudinal recording system, which causes adverse effect to the recording characteristics. Accordingly, it is desired not to use the protective layer on the magnetic medium layer, and use of the Ni-Cu-P three-component alloy layer for the magnetic medium layer becomes more effective. There is a strong demand to reduce a distance to float the head to be in the range of 0.1 μm–0.2 μm. For this, elimination of the protective layer having a thickness of 0.03 μm–0.08 μm) provides a great advantage.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic disc comprising a base substrate, a coating layer as an intermediate layer and a layer of magnetic recording medium, wherein said coating layer consists essentially of Cu in the range of 34±5% by weight, P in the range of from 7 to 11% by weight, and the rest, at most 60% by weight, being Ni.

2. The magnetic disc according to claim 1, wherein said coating layer is formed by chemical plating.

* * * * *